(12) United States Patent
Watanabe et al.

(10) Patent No.: US 7,294,784 B2
(45) Date of Patent: *Nov. 13, 2007

(54) ELECTRIC SUPPLY APPARATUS (75) Inventors: Norio Watanabe, Shizuoka (JP); Naoto Kogure, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/267,288

(22) Filed: Nov. 7, 2005

(65) Prior Publication Data
US 2006/0134934 A1 Jun. 22, 2006

(30) Foreign Application Priority Data
Dec. 22, 2004 (JP) .............................. 2004-371178

(51) Int. Cl.
*H02G 1/00* (2006.01)
(52) U.S. Cl. ..................... 174/72 A; 174/135
(58) Field of Classification Search ............. 174/72 A, 174/68.1, 68.3, 69, 97, 98, 99 R, 135; 191/22 R, 191/23 R
See application file for complete search history.

(56) References Cited

U.S. PATENT DOCUMENTS 7,075,011 B1* 7/2006 Kogure et al. ............ 174/72 A
7,151,224 B2* 12/2006 Kogure et al. ............ 174/72 A
2003/0121692 A1* 7/2003 Kato et al. ................. 174/68.1
2006/0134970 A1* 6/2006 Watanabe et al. ........... 439/501

FOREIGN PATENT DOCUMENTS

| DE | 101 18 203 B4 | 10/2001 |
|---|---|---|
| DE | 10 2004 051 363 A1 | 6/2005 |
| DE | 102004051363 A1 | 6/2005 |
| JP | 2002-17032 | 1/2002 |

* cited by examiner

*Primary Examiner*—Jinhee Lee
(74) *Attorney, Agent, or Firm*—Kratz, Quintos & Hanson, LLP (57) ABSTRACT

The present invention is to provide an electric supply apparatus having a small size protector and being long lifetime. The electric supply apparatus having a wiring harness includes a protector; an annular wall disposed inside the protector, the wiring harness being bent freely along the annular wall; a leaf spring arranged around the annular wall, the leaf spring being fixed to the annular wall at a base end; and a spring holder disposed at a front end of the leaf spring for holding the wiring harness at a loop forming portion thereof. The spring holder is bent at a middle portion thereof with an angle in a direction of tangent of the annular wall. The spring holder fastens protective tubes of the wiring harness. The spring holder fastens end portions of a corrugated tube and a net tube which form the protective tube, and the net tube is disposed along the leaf spring.

8 Claims, 10 Drawing Sheets

ELECTRIC SUPPLY APPARATUS

BACKGROUND OF THE INVENTION

1. Field of the Invention

The present invention relates to an electric supply apparatus having a wiring harness being bent freely in a protector and urged by a leaf spring to absorb sag thereof.

2. Description of the Related Art

Figure 13:
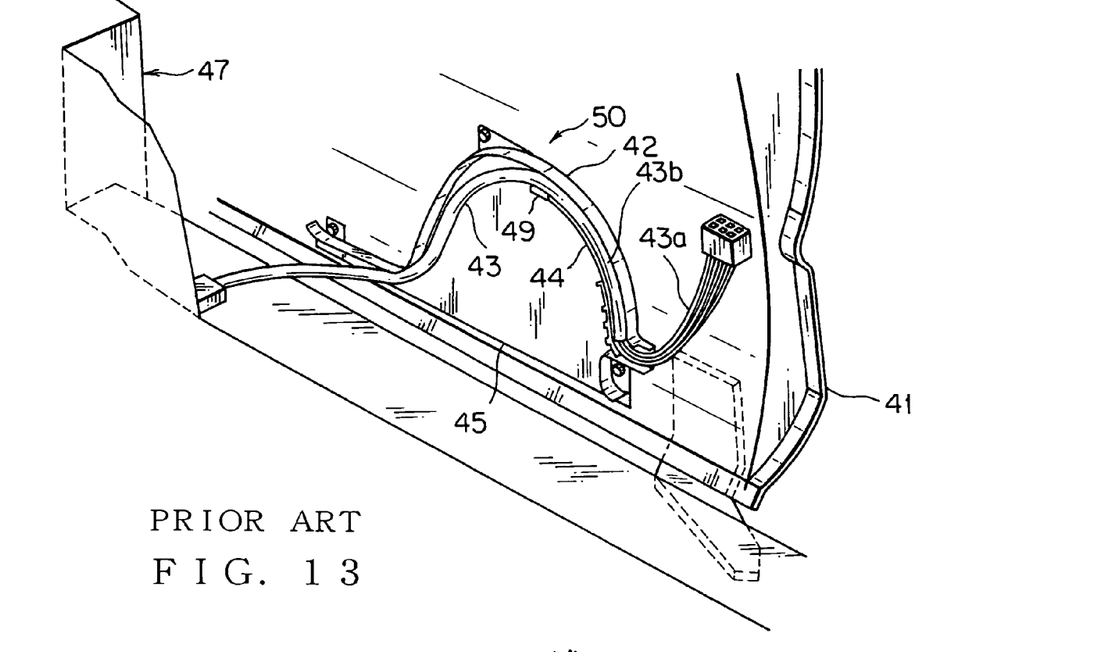
FIG. 13 is a perspective view showing an embodiment of a conventional electric supply apparatus.
Figure 14:
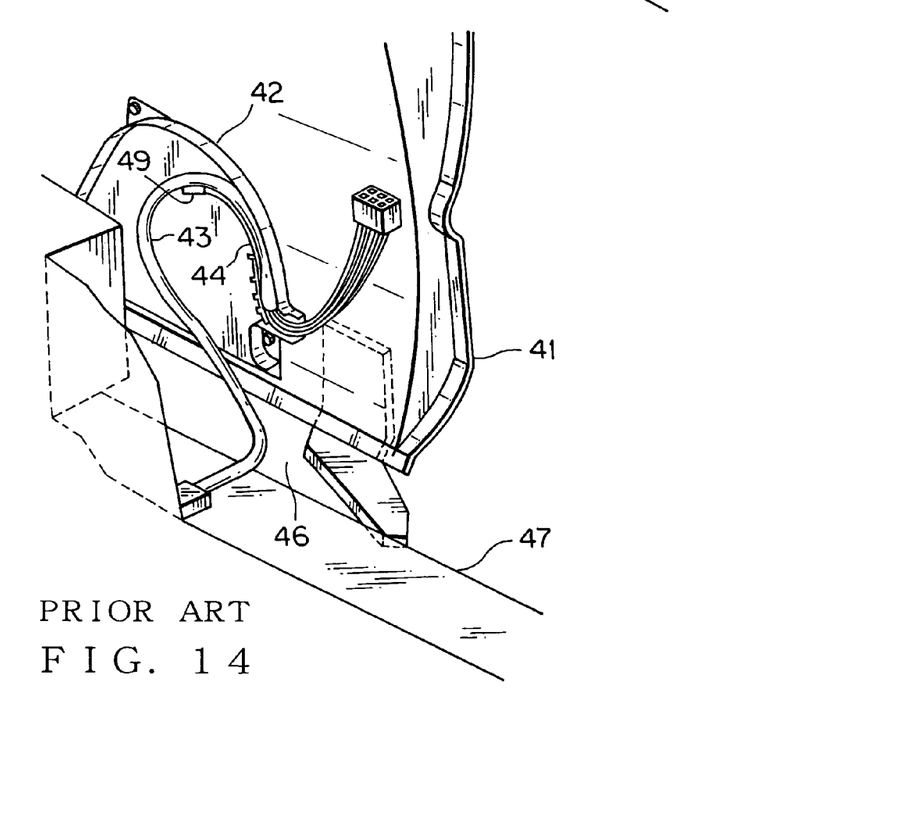
FIG. 14 is a perspective view showing an operation of the conventional electric supply apparatus.

FIGS. 13 and 14 are an embodiment of a conventional electric supply apparatus, for example, JP,2002-17032,A.

The electric supply apparatus 50 is disposed in a sliding door 41 of a motor vehicle. The electric supply apparatus 50 has a protector 42 (a cover is not shown), which is made of a synthetic resin, receiving a wiring harness 43 flexibly, and a metal leaf spring 44 to urge the wiring harness 43 upwardly in the protector 42.

A lower end portion of the leaf spring 44 is fixed to a forward and lower portion of the protector 42 together with the wiring harness 43. A front end portion of the leaf spring 44 supports the wiring harness 43 slidably. The front end portion of the leaf spring 44 is covered with a cap 49 made of a synthetic resin and supports stably the wiring harness 43.

The wiring harness 43 has a plurality of electric cables 43a covered with a corrugate tube 43b made of a synthetic resin. The flexible corrugated tube 43b is fixed to the protector 42 with a tape at a front and lower end portion.

One end portion of the electric cables 43a of the wiring harness 43 is led out through a front portion of the protector 42 to auxiliary units of the sliding door 41. The corrugated tube 43b of the wiring harness 43 is wired to a vehicle body 47 slidably through an elongated lower opening 45 of the protector 42 and a stepping space 46.

FIG. 13 shows a fully closed state of the sliding door 41 and FIG. 14 is a half opened state close to a fully opened state. The wiring harness 43 is pulled backwardly at the fully closed state, and pulled forwardly at the fully opened state. When the sliding door 41 is in the half opened state, the wiring harness tends to sag downwardly. However, the leaf spring 44 urges the wiring harness 43 upwardly to absorb the sag (excess length) and prevent to be sandwiched by other portions.

In the conventional electric supply apparatus, especially for vehicles having a large sliding distance of a sliding door 41, an excess length of the wiring harness 43 in the protector becomes large so that the height of the protector becomes large and arrangements of other parts in the sliding door are reduced.

When the sliding door is fully closed or opened, the wiring harness 43 is strongly pulled so that the lifetime of the wiring harness 43 is reduced at the portion fixed at the protector 42. The corrugated tube 43b is utilized as a protective tube of the wiring harness 43 in the protector. However, the corrugated tube 43b has a lower flexibility compared with a net tube, not shown, made of a synthetic resin.

SUMMARY OF THE INVENTION

The present invention is to provide an electric supply apparatus having a small and compact protector, giving a higher flexibility of a wiring harness in the protector, and having a long lifetime of the wiring harness.

According to a first aspect of the invention, an electric supply apparatus having a wiring harness includes a protector; an annular wall disposed inside the protector, the wiring harness being bent freely along the annular wall; a leaf spring arranged around the annular wall, said leaf spring being fixed to the annular wall at a base end; and a spring holder disposed at a front end of the leaf spring for holding the wiring harness at a loop forming portion thereof.

Thereby, the leaf spring and loop forming portion are fixed together so that they do not slip each other. The leaf spring urges the loop forming portion directly with a restoring force and assuredly expands the loop portion. Accordingly, the electric supply apparatus can be made small size. Thereby, a tension of the wiring harness acts on the leaf spring instead of a supporting portion of the loop portion so that the lifetime of the supporting portion becomes long.

According to a second aspect of the invention, the spring holder is bent at a middle portion thereof with an angle in a direction of tangent of the annular wall.

Thereby, the bent spring holder contacts slidably and stably with the annular wall of the protector so that the loop forming portion of the wiring harness is bend freely. The loop portion is arranged in the direction of tangent of the annular wall from the spring holder so that the loop portion is not subjected to an excess flexure stress at an end of the spring holder and increases the lifetime.

According to a third aspect of the invention, the spring holder has a leaf spring holder at the bent side thereof.

Thereby, a front end of the leaf spring is attached integrally to the bent portion of the spring holder in a direction of tangent of the annular wall of the protector so as that the front end of the leaf spring is not subjected to large flexure stress. The lifetime of the spring holder increases. The leaf spring urges the loop forming portion smoothly and assuredly.

According to a fourth aspect of the invention, the spring holder fastens protective tubes of the wiring harness.

Thereby, a plurality of electric cables inside the protective tubes are freely passed through the spring holder. Since tensile force acts directly on the protective tubes, the electric cables are subjected to less tensile force.

According to a fifth aspect of the invention, the spring holder has a rib at an inner wall of a middle portion thereof and the rib extends inwardly higher than an inner face of an end portion of the protective tube.

Thereby, the electric cables are supported by the rib separately from the end of the protective tube so that the interference between them is prevented especially at the bent portion of the spring holder.

The separation is especially effective for the corrugated tube having a sharp end (cut end) utilized for the protective tube.

According to a sixth aspect of the invention, the spring holder fastens end portions of a corrugated tube and a net tube which form the protective tube and the net tube is disposed along the leaf spring.

Thereby, the corrugated tube and net tube are connected to each other through the spring holder. The net tube has more flexibility than the corrugated tube and freely bends along the leaf spring and the annular wall of the protector so that the wiring harness is bent in a small diameter.

According to a seventh aspect of the invention, the spring holder includes a first holder having ribs for engaging with grooves of the corrugated tube and a second holder for holding an insertion member attached to the net tube.

The insertion member is resin molded by applying a resin into a molding die receiving the end of the net tube. The spring holder is formed to be divided and is joined together after setting the protective tubes.

According to a eighth aspect of the invention, the spring holder has thorny protrusions to be engaged with the grooves of the corrugated tube penetrating through the net tube covering an outer face of the corrugated tube.

Thereby, a length of the spring holder is reduced by a extent of an overlapping between the corrugated tube and net tube.

DETAILED DESCRIPTION OF PREFERRED EMBODIMENTS

FIGS. 1-4 show an embodiment of an electric supply apparatus according to the present invention.

Figure 1:
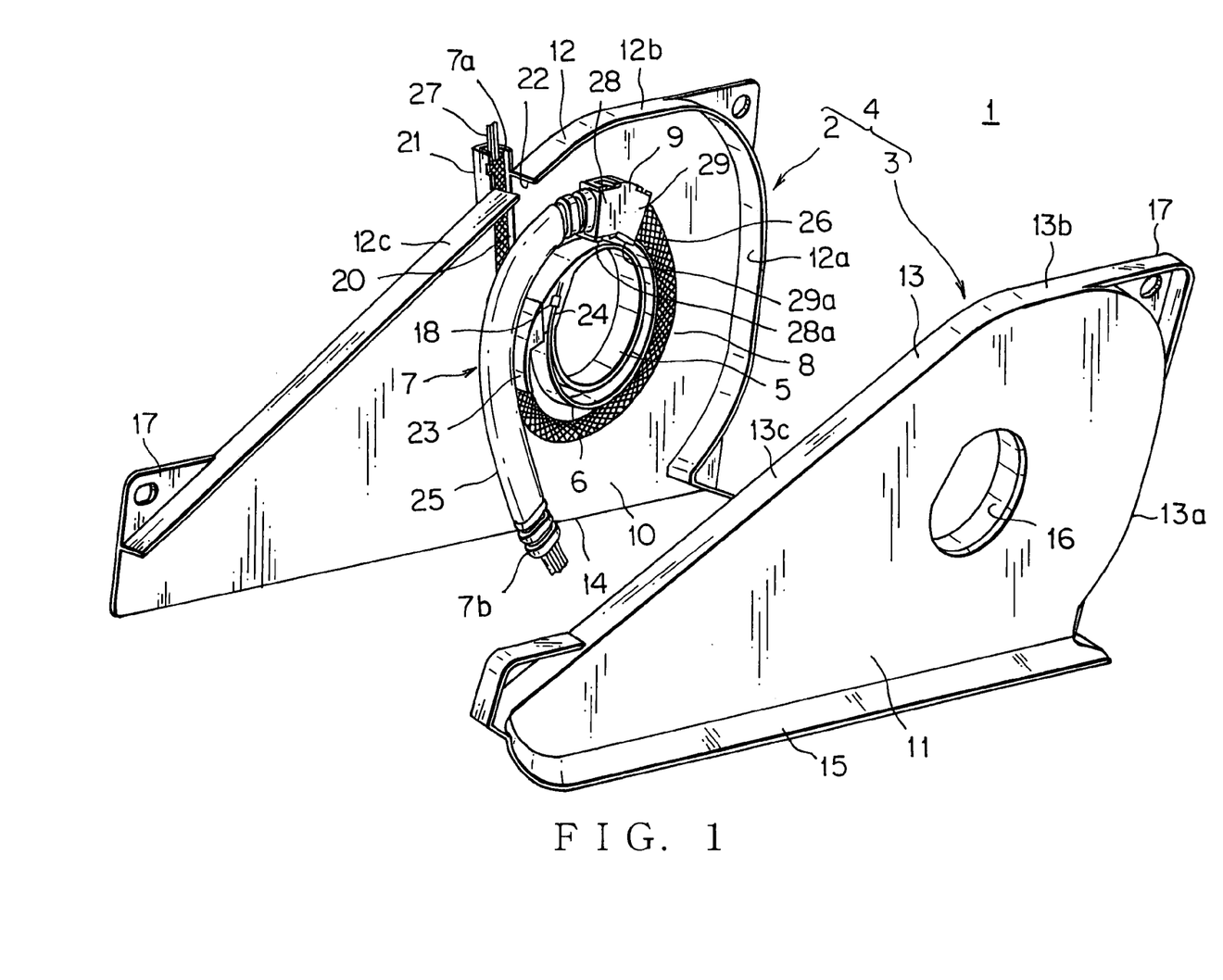
FIG. 1 is an exploded perspective view of an embodiment of an electric supply apparatus according to the present invention.

The electric supply apparatus 1, as shown in FIG. 1, includes a protector 4 having a base 2 and a cover 3 made of a synthetic resin, a leaf spring 6, being made of a metal, wound flexibly around an annular wall 5 disposed inside the base 2, a wiring harness 7 arranged around the annular wall 5 to form a loop portion 8, and a spring holder 9, being made of a synthetic resin and holding a front end of the leaf spring 6, for fastening a middle portion of the wiring harness 7 in a longitudinal direction, or a part of the loop portion 8. The electric supply apparatus 1 is mounted to a sliding door, not shown, of a motor vehicle.

The base 2 and cover 3 of the protector 4 each have a triangle or trapezoidal base plate 10, 11 and a peripheral wall 12, 13 respectively. The each peripheral wall 12, 13 has a vertical front wall 12a, 13a, a horizontal upper wall 12b, 13b and a sloping rear wall 12c, 13c respectively. When the cover 3 is covered to the base 2, the peripheral wall 13 of the cover 3 is positioned around and outside the peripheral wall 12 of the base 12 and an elongated opening 14 is formed at a lower end of the protector 4 for guiding out the wiring harness 7.

A wiring harness guiding wall 15 with a curved section extends outwardly from the lower opening 14 of the cover 3. An annular wall 16 is disposed at the center of the cover 3 and protrudes toward the base side for engaging with and inside the annular wall 5 of the base 2. The protector 4 is shorter in height than the conventional one (FIG. 13). This is because the wiring harness 7 is received in a loop form manner. The protector 4 is fixed vertically to the sliding door with brackets 17.

Figure 2:
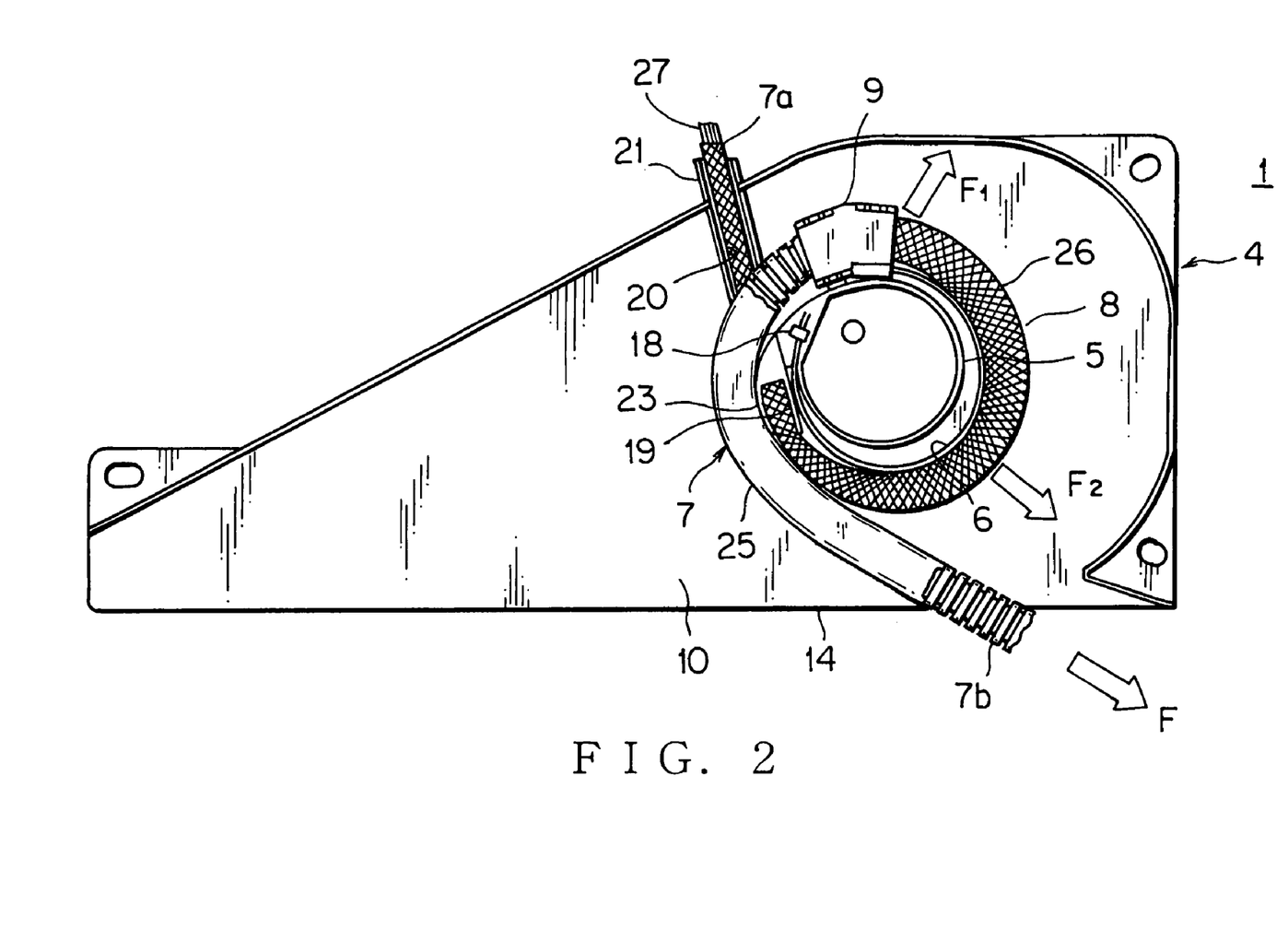
FIG. 2 is a front view showing an operation of the electric supply apparatus at fully opened state.
Figure 3:
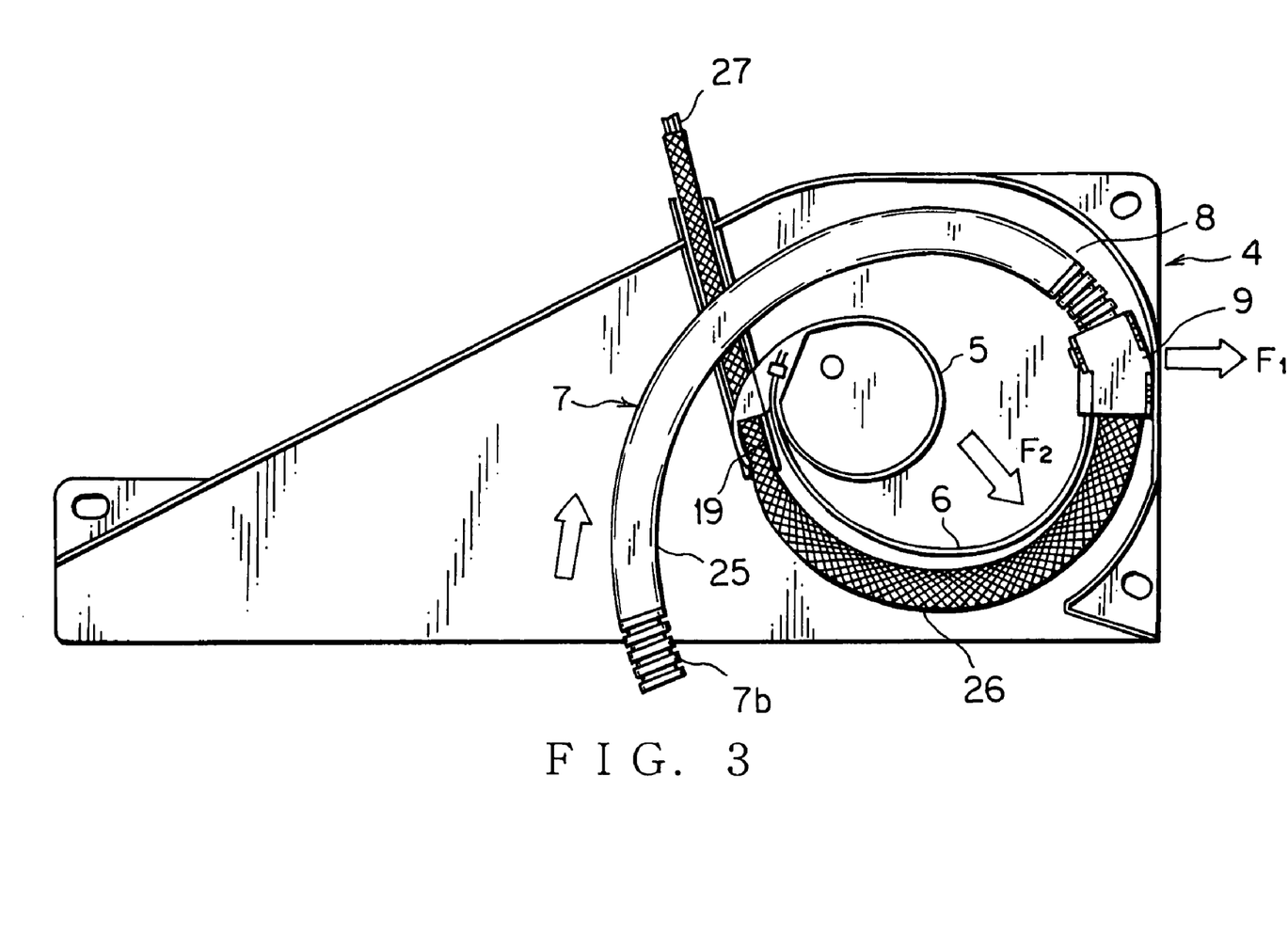
FIG. 3 is a front view showing an operation of the electric supply apparatus at half opened state.
Figure 4:
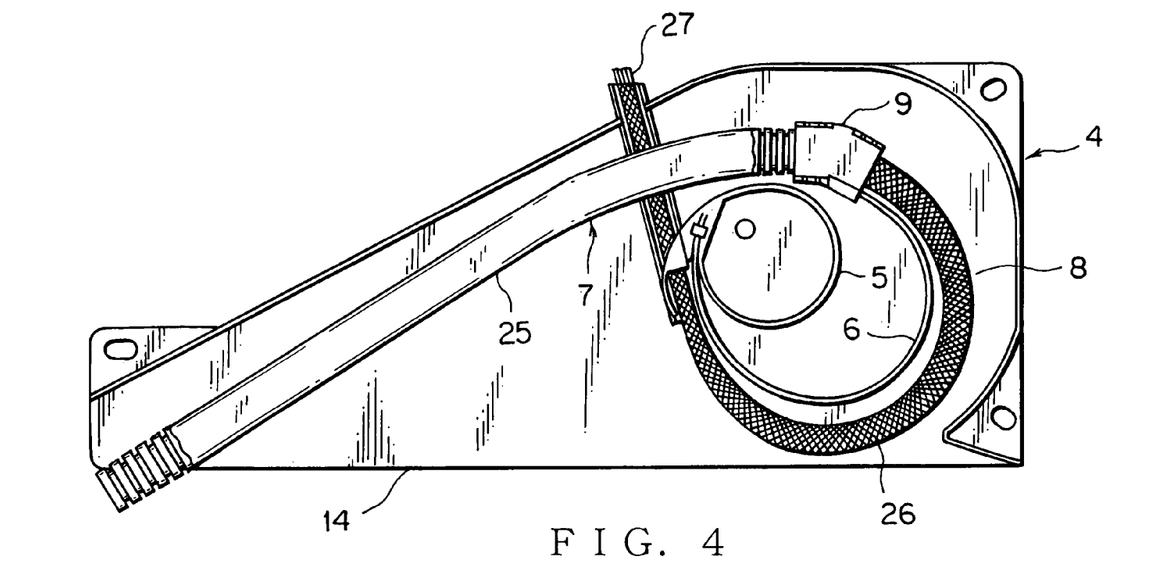
FIG. 4 is a front view showing an operation of the electric supply apparatus at fully closed state.

The annular wall 5 is disposed at about the center of the base 2. A spring holder 18 is integrally disposed at a rear side of the annular wall 5, or at the left side of FIG. 1. As shown in FIGS. 2-4, a narrow wiring harness lead-out 19 is disposed at the base plate 10 and adjacent to the rear side of the spring holder 18, and is connected to a U-shaped groove 20. The U-shaped groove 20 is located inside a gutter 21 extending outwardly from the base plate 10. A cutout 22 is formed in the peripheral wall 12 of the base 2 intersecting with the U-shaped groove 20. A curved wiring harness guiding wall 23 is disposed adjacent to the rear side of the wiring harness lead-out 19 and extends from an upper portion of the annular wall 5 with an @-shaped character. In the description, the front and rear of the electric supply apparatus 1 correspond to those of the motor vehicle.

A base end of the leaf spring 6 is press inserted into a slit 24 and fixed to the spring holder 18. The leaf spring 6 is disposed around about three quarters of the annular wall 5 and has an outward restoring force. Refer to FIGS. 1 and 2. The leaf spring 6 is straight without restriction and is bent resiliently to be set to the base 2.

The wiring harness 7 is arranged around the annular wall 5 and the leaf spring 6 in the loop manner. One end 7a of the wiring harness 7 is upwardly led out through the U-shaped groove 20 and fixed to the gutter 21 and arranged in a sliding door to connect auxiliary units such as power window unit, door lock unit or mirror unit (not shown). The other end 7b of the wiring harness 7 is arranged into a vehicle body from the guiding wall 23 through the lower opening 14. A corrugated tube 25 of the wiring harness 7 can move freely inside the base plate 10 independently of a net tube portion 7a (26) inside the groove 20.

The spring holder 9 is fixed to the front end of the leaf spring 6 and the protective tubes 25, 26 of the loop portion 8 of the wiring harness 7 are fixed to the spring holder 9. The protective tubes of the present invention include the net tube 26 and the corrugated tube 25. The net, or knitted, tube 26 made of a synthetic resin is arranged from the groove 20 to the spring holder 9 along the annular wall 5. The corrugated tube 25 made of a synthetic resin is arranged from the spring holder 9 to the vehicle body through the lower opening 14. The net tube 26 and the corrugated tube 25 are connected to each other through the spring holder 9.

The net tube 26 is more flexible than the corrugated tube 25. The corrugated tube 25 has more rigidity than the net tube 26 and safely protects the wiring harness 7 from outside interference. The corrugated tube 7 of the embodiment has an oval section, the long axis of which is arranged parallel to the base plate 10. The wiring harness 7 includes the protective tubes 25, 26 and a plurality of electric cables 27 received therein.

The spring holder 9 is a nearly V-shaped form, the open portion of V facing to the annular wall 5, and can move freely around the annular wall 5. The spring holder 9 has a first receiver face 28a and a second receiver face 29a facing to the annular wall 5. Both receiver faces 28a, 29a intersect obtusely each other. When the first receiver face 28a contacts with an outer face of the annular wall 5, the second receiver face 29a concurrently contacts with the outer face of the annular wall 5 so that the spring holder 9 can move freely around the annular wall 5 by means of the intersecting receiver faces 28a, 29a.

The corrugated tube 25 is fixed at a first holder 28 having the first receiver face 28a and the net tube 26 is fixed at a second holder 29 having the second receiver face 29a. An outer face opposing to the receiver faces 28a, 29a of the holder 9 can be a nearly V-shape or curved shape. The inner face of the holder 9 may have a curved or arced face instead of the reversed V-shaped face.

FIG. 2 shows that a right side sliding door is fully opened. The sliding door is moved backwardly with the electric supply apparatus 1. The wiring harness 7 is wound around the annular wall 5 and led out forwardly to a harness holder of the vehicle body, through the lower opening 14 of the protector 4 (the cover 3 not shown). The leaf spring 6 is curved around the annular wall 5 with the loop portion 8 of the wiring harness 7 and has a smallest diameter.

A tension F exerted on the wiring harness 7 acts on the spring holder 9 through the corrugated tube 25 and acts on the leaf spring 6 in a lengthwise direction thereof through the spring holder 9. The metal leaf spring 6 is directly pulled so that the net tube 26, extending from the spring holder 9 to the wiring harness lead-out 19, and the electric cables 27 received therein are hardly pulled and the endurance thereof increases.

In FIG. 2, the spring holder 9 at the end of the leaf spring 6 is subjected to an upward and diagonally forward force F1 due to a restoring force of the leaf spring 6. The loop forming portion 8 of the wiring harness 7 is subjected to a downward and diagonally forward force F2 at a middle portion of the leaf spring 6 due to the restoring force of the leaf spring 6. The restoring force F1 and expanding force F2 are perpendicular to each other.

FIG. 3 shows a partially opened state of the sliding door. At this state, the wiring harness 7 usually hangs down between the vehicle body and the sliding door. However, the restoring force F1 of the spring holder 9 due to the leaf spring 6 and the expanding force F2 of the leaf spring 6 prevent the wiring harness 7 from hanging down. Accordingly, the loop portion 8 of the wiring harness 7 expands outwardly the annular wall 5 with a large diameter from the wiring harness lead-out 19. The portion 7b of the corrugated tube 25 of the wiring harness 7 is returned inside the protector 4 through the lower opening 14 and the excess length is assuredly received. In FIG. 3, the restoring force F1 acts forwardly and the expanding force F2 acts diagonally forward and downward.

The front end of the leaf spring 6 is fixed to the protective tubes 25, 26 at the loop portion 8 of the wiring harness 7 through the spring holder 9. Then, an urging force of the leaf spring 6 acts directly on the wiring harness 7 so that the loop portion 8 assuredly expands and contracts without slipping and receives the excess length, or sag, of the wiring harness 7.

In FIG. 3, when the loop portion 8 expands in diameter, the net tube 26 and the electric cables 27 therein are subjected to a compressive force. The compressive force is applied to the leaf spring 6 through the spring holder 9 without acting to the net tube 26 and the electric cables 27. Accordingly, the endurance of the net tube 26 and the electric cables 27 is improved.

FIG. 4 shows the sliding door fully closed. The sliding door moves to the front side of the vehicle with the electric supply apparatus 1. The wiring harness 7 is led out to a wiring harness holder of the vehicle body, not shown, through the lower opening 14 of the protector 4. The loop portion 8 expands in diameter with the leaf spring 6 so that the wiring harness 7 slides backwardly in the lower opening 14 when the sliding door is closed.

The leaf spring 6 is directly subjected to a tension exerted on the net tube 26 through the spring holder 9. Hence, similarly to the fully opened state of the sliding door in FIG. 2, the tension is not applied to the net tube 26 and the electric cables 27 therein so that the endurance thereof is improved.

When the sliding door is opened from the closed state of FIG. 4, the operation is reversed from FIG. 4 to FIG. 3 and FIG. 2. When the sliding door is opened, the function of the leaf spring 6 and the spring holder 9 are the same as the closing operation of sliding door.

Figure 5:
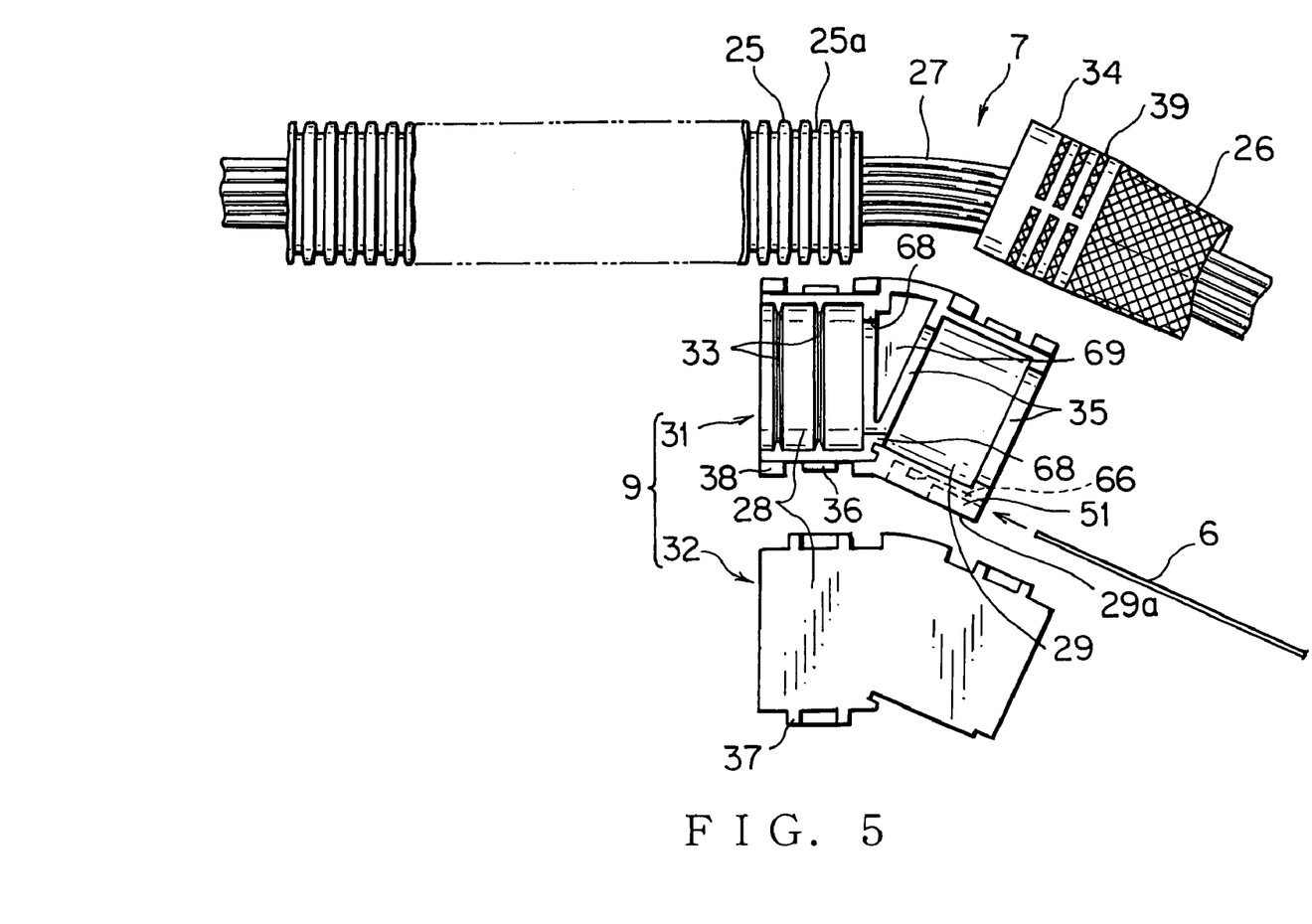
FIG. 5 is an exploded front view showing a spring holder of the electric supply apparatus and a connection with a wiring harness.
Figure 6:
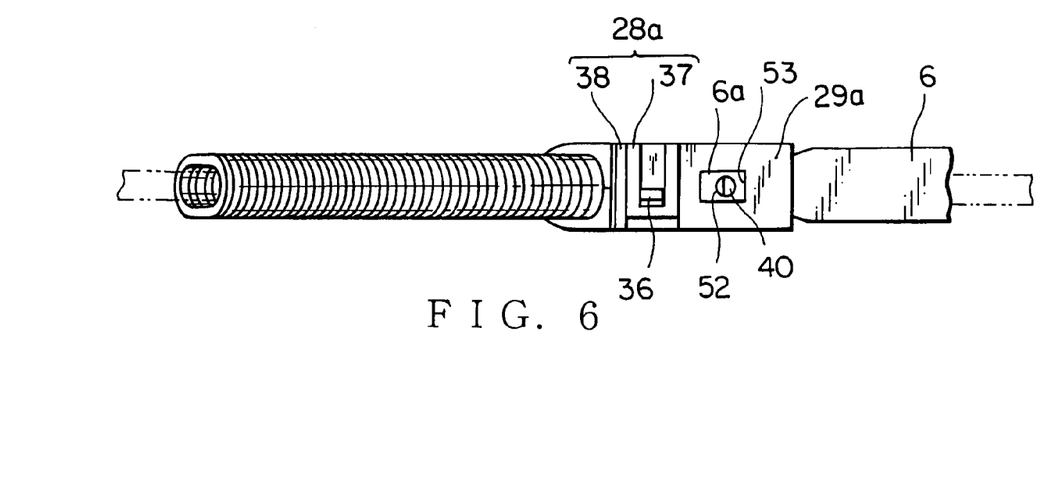
FIG. 6 is a front view, viewed from a receiver face side of the spring holder, showing the connection between the spring holder and the wiring harness.

FIG. 5 shows an exploded view showing an embodiment of an assembly of the spring holder 9, the protective tubes 25, 26 of the wiring harness 7 and the leaf spring 6. FIG. 6 shows a plan view of the assembled state.

As shown in FIG. 5, the spring holder 9 has a holder base 31 and holder cover 32 at each side. The holder base 31 and holder cover 32 are made of a synthetic resin and each has a semicircular section and bent at the center. The spring holder 9 has the first holder 28 for the corrugated tube 25 at one end and the second holder 29 for the net tube 26 at the other end.

The first holder 28 has a plurality of ribs 33, two ribs in the present embodiment, arranged parallel to each other to be engaged with grooves 25a of the corrugated tube 25 at an inner wall of the oval tube. The second holder 29 has a pair of ribs 35 opposed to each other to hold an insertion member 34 of the net tube 26 at the inner wall of the oval or circular tube. A pitch of the ribs 33 has n times pitch of the grooves 25a of the corrugated tube 25, where n is integer such as 1, 2, 3.

A fan-shaped space 69 is disposed between the first holder 28 and the second holder 29. The fan-shaped space 69 is utilized for allowing the exposed cables 27 between the protective tubes 25, 26 to pass through. The fan-shaped space 69 has a rib 68 at the first holder side and the ribs 35 at the second holder side. The rib 68 is arranged parallel to the ribs 33 for holding the corrugated tube 25.

The holder base 31 and holder cover 32 are joined together with a locking means such as locking protrusions 36 and engaging frames 37 and form the tube having the oval section. The locking means is not limited to the embodiment shown but may employ a locking arm and a locking recess. The first receiver face 28a of the first holder 28 are formed to be flush with the engaging frame 37, the locking protrusion 36 engaged into the frame, and ribs 38 at both sides of the frame 37.

The insertion member 34 is formed with insert molding by inserting an end of the net tube 26 into a synthetic resin material in a molding tool so that the insertion member 34 is integral with the net tube 26. The ribs utilized at the first holder 28 can be used for engaging with grooves 39 disposed around the insertion member 34 instead of the pair of the ribs 35.

A leaf spring holder 51 having a slit 66 for inserting the leaf spring 6 and a locking protrusion 40 inside the slit, see FIG. 6, are disposed at the second receiver face 29a of the second holder 29 of the holder base 31. The holder cover 32 is formed not to cover the leaf spring holder 51.

As shown in FIG. 6, a front end portion 6a of the leaf spring 6 is formed narrow and has a circular engaging through-hole 52 to be engaged with the locking protrusion 40. An opening 53 is disposed at the second receiver face 29a of the holder base 31 and is opposed to the locking protrusion 40. Fixing structure of the leaf spring 6 is same as that of conventional spring caps. An angle between the first receiver face 28a of the first holder 28 and the second receiver face 29a of the second holder 29 is set to contact with the outer face of the annular wall 5 of the protector 4.

An assembling is performed as follows. The plurality of the electric cables 27 are inserted into the corrugated tube 25 and the net tube 26 as shown in FIG. 5. An end portion of the corrugated tube 25 is engaged with the first holder 28 of the holder base 31. The insertion member 34 of the net tube 26 is engaged with the second holder 29 of the holder base 31. The holder cover 32 is covered to the holder case 31 for locking to obtain the assembly given in FIG. 6. Then, both the protective tubes 25, 26 are connected to each other through the spring holder 9.

Figure 7:
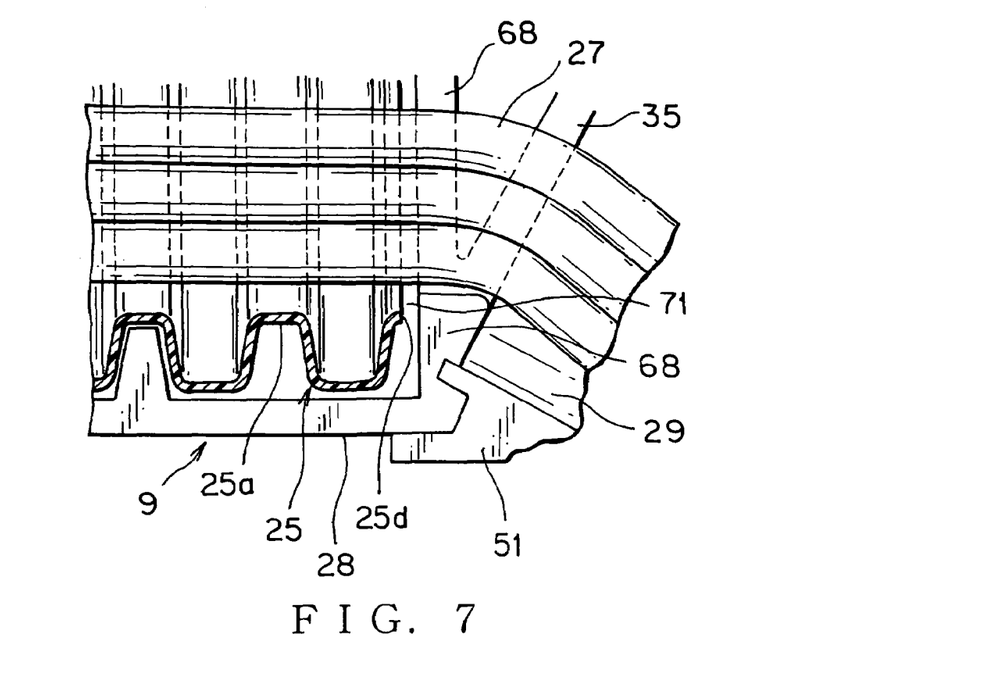
FIG. 7 is a substantial sectional view showing a supporting structure of electric cables inside the spring holder.

FIG. 7 shows the assembled state of the electric cables 27 inserted into the spring holder of FIG. 5. The rib 68 of the first holder 51 at the center and a bent portion of the spring holder 9 extends inwardly and higher than an end 25d, cutting end, of the corrugated tube 25. The electric cables 27 are supported by an end of the rib 68 and a gap 71 is formed between the end 25d and the electric cables 27 not to contact with each other. This arrangement is same all around the rib 68 so as to prevent damage and wear to the electric cables 27 resulting from interference with the end 25d of the corrugated tube 25.

The ribs 35 of the second holder 29 also extend inwardly from the net tube 26 and are higher than that of an inner face at an end of the insertion member 34. Hence, the interference between the inner face at the end of the insertion member 34 and the electric cables 27 is prevented so as to avoid damage and wear to the electric cables 27. The rib 35 at the bent portion of the spring holder 9 is integral with the rib 68. The insertion member 34 is a part of the net tube 26.

In the present embodiment, the spring holder 9 and insertion member 34 are formed separately. Both the holder base 31 and the insertion member 34 or both the holder cover 32 and the insertion member 34 can be molded integrally. In this case, the net tube 26 is fixed with the insertion member 34. The net tube 26 can be insert molded to the holder base 31 or the holder cover 32 without the insertion member 34. Then, a number of parts is reduced and a connecting structure of the protective tubes is manufactured with low cost.

Figure 8:
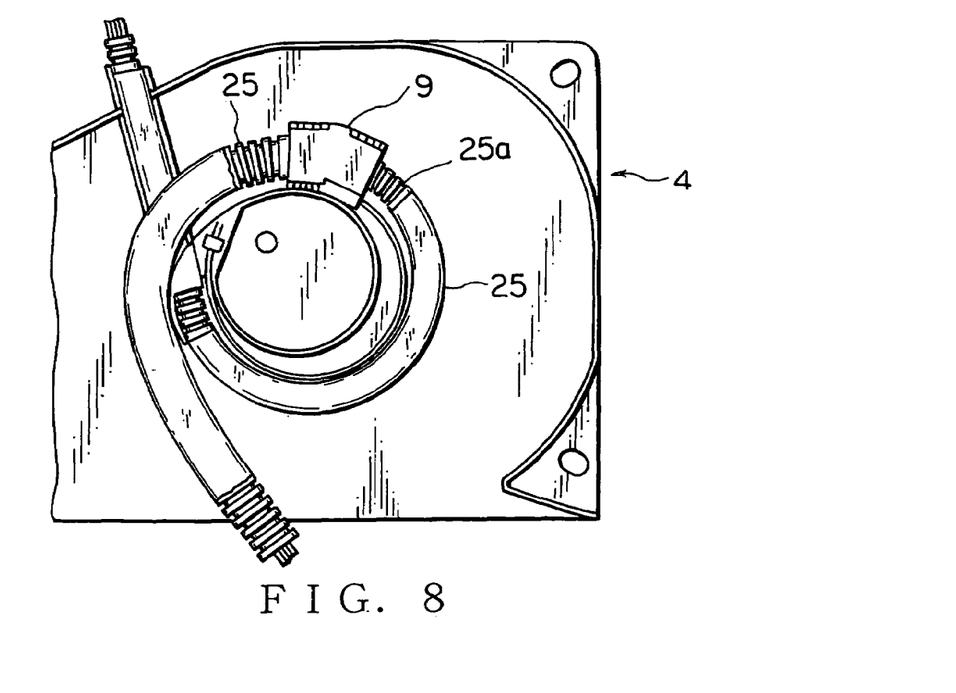
FIG. 8 is a front view showing another embodiment of a connection of protective tubes of the wiring harness.
Figure 9:
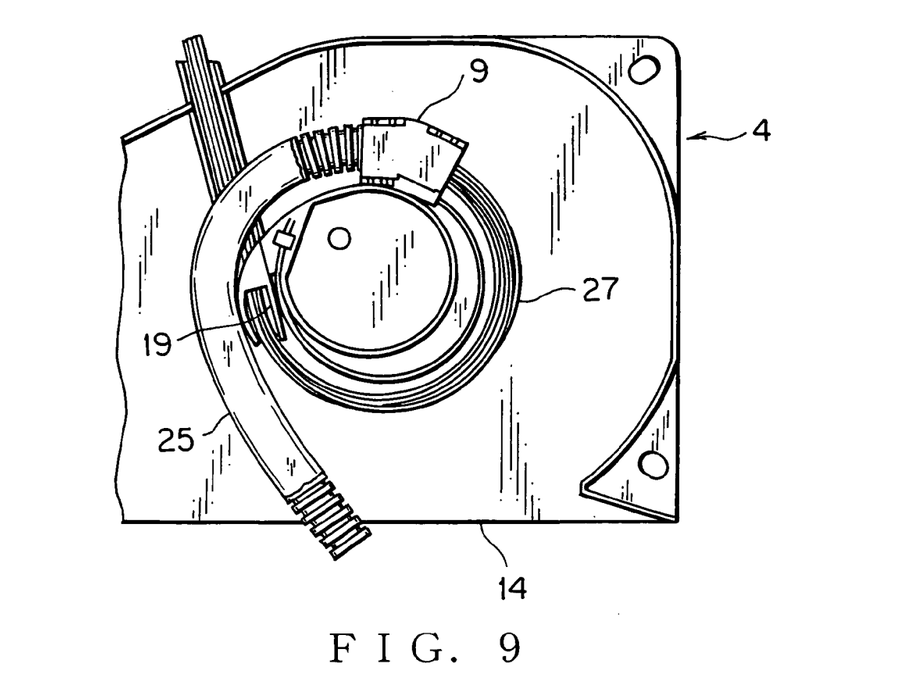
FIG. 9 is a front view showing still another embodiment of a connection of protective tubes of the wiring harness.

The corrugated tube 25 and net tube 26 are utilized as the protective tube in the above embodiment. As shown in FIG. 8, corrugated tubes can be disposed at both sides of the spring holder 9. As shown in FIG. 9, the corrugated tube 25 can be disposed at the one side of the spring holder 9, extending to the lower opening 14 of the protector 4, and the plurality of the cables 27 without the protective tube can be disposed at the other side, extending to the wiring harness lead-out 19. The flexibility of the electric cables 27 increases without using the protective tubes 25, 26.

The spring holder 9 of FIG. 8 has the ribs 33 at both the first and second holders 28, 29 and locks the grooves 25a of the each corrugated tube 25.

The plurality of the cables 27 can be directly fixed to the spring holder 9 at the both sides thereof without the protective tubes 25, 26. In this case, the electric cables are fixed at an extension, not shown, of the spring holder with a tape or band. A clip, not shown, binding the electric cables can be locked to the spring holder.

The oval-sectioned corrugated tube 25 is utilized in the embodiment but a circular-sectioned corrugated tube can also be utilized. In this case, the holders are formed into a cylindrical tube having a circular section.

Figure 10:
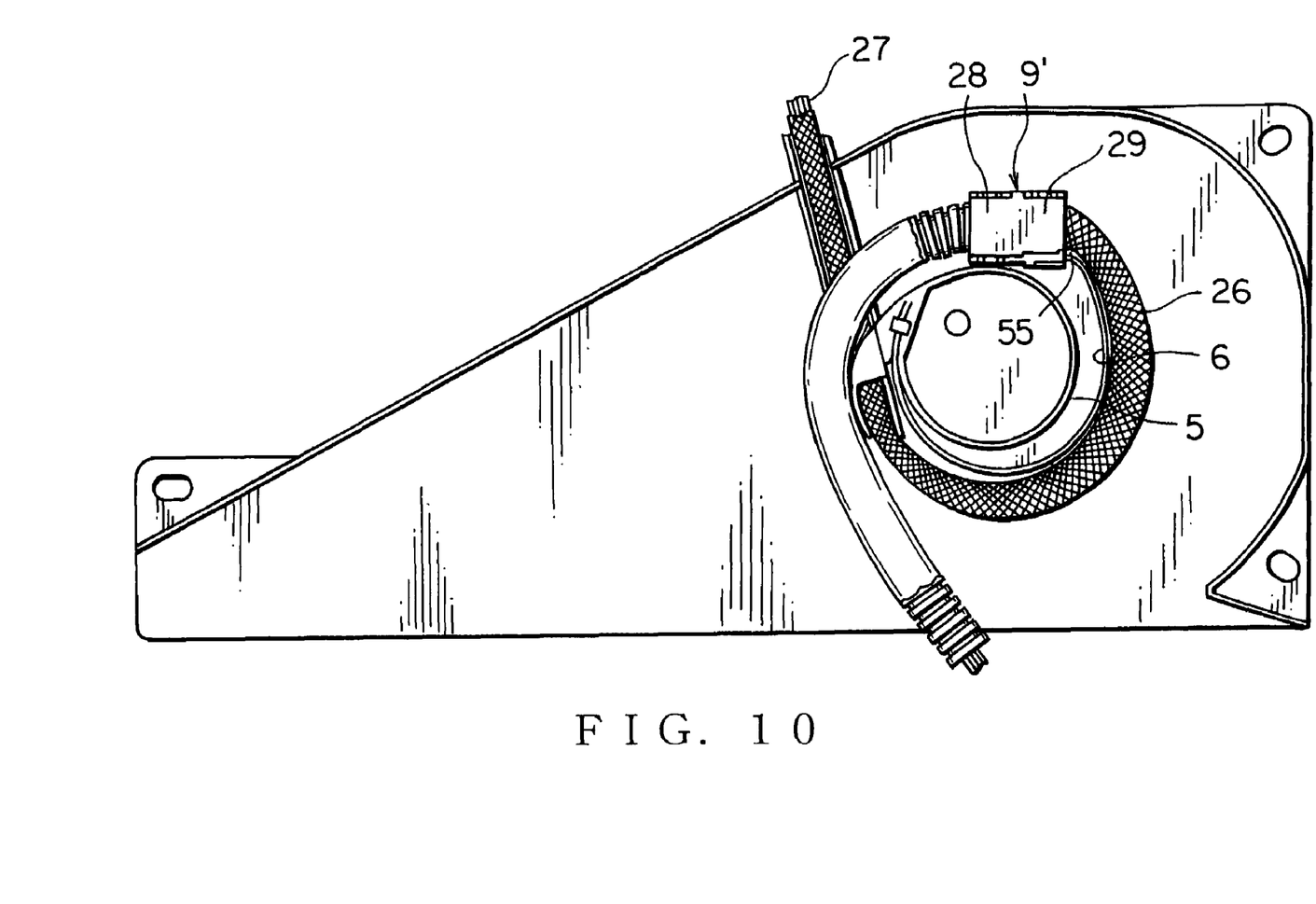
FIG. 10 is a front view showing an electric supply apparatus utilizing another embodiment of a spring holder.

In the embodiment, the spring holder 9 is bent at the center but can be straight such as a spring holder 9' as shown in FIG. 10. In the case of the straight spring holder 9', the protective tube 26, the electric cables 27 therein and the leaf spring 6 bend in a small curvature especially at the end of the second holder 29 noted as numeral 55 in FIG. 10 and are subjected to a large bending stress. Therefore, the straight type spring holder 9' is only utilized for the annular wall having a large diameter. The protector cover 3 is omitted in FIG. 10.

Figure 11:
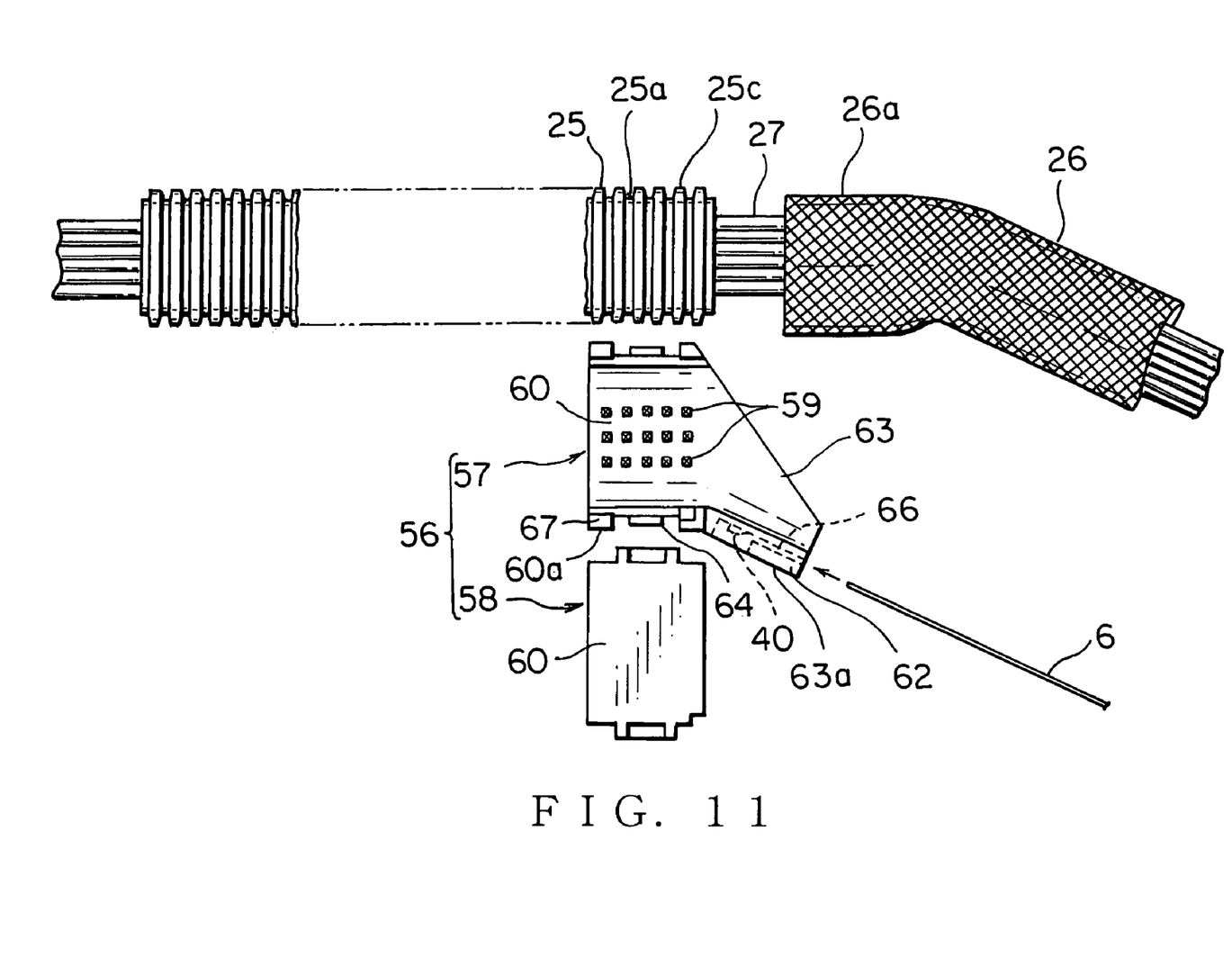
FIG. 11 is an exploded front view showing still another embodiment of a spring holder and a connection with the wiring harness utilizing the spring holder.
Figure 12:
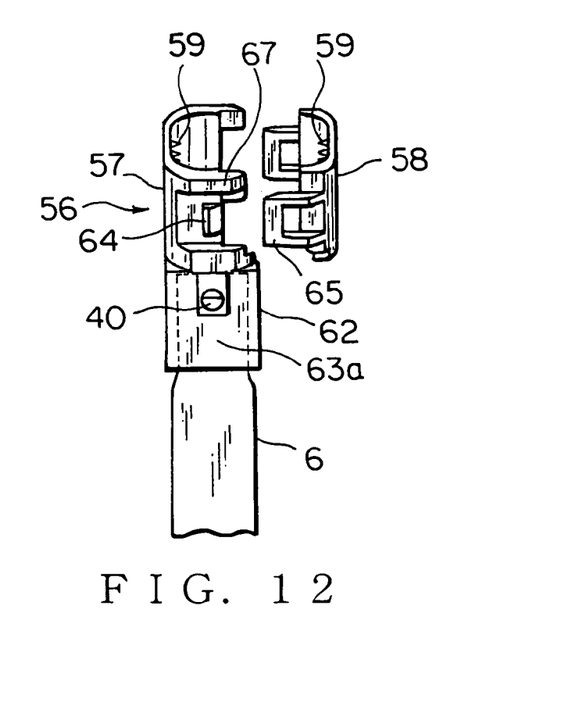
FIG. 12 is an exploded plan view, viewed from a receiver face side, showing the spring holder.

In the embodiment, the net tube 26 is fixed to the spring holder 9 with the insertion member 34 as shown in FIG. 5. FIGS. 11 and 12 show another embodiment. A plurality of thorny protrusions 59 are disposed inside a holder base 57 and holder cover 58 of a spring holder 56. An outer face of an end portion 25c of the corrugated tube 25 is covered with an end portion 26a of the net tube 26. Then, the corrugated tube 25 is covered with the holder base 57 and holder cover 58 over the net tube 26. The thorny protrusions 59 penetrate into the net tube 26 and engage with the grooves 25a of the corrugated tube 25 so as to connect the both protective tubes 25,26. The thorny protrusions 59 may be engaged directly with the grooves 25a of the corrugated tube 25 without the net tube 26, which is pushed away outside the spring holder 56 by the thorny protrusions 59.

The spring holder 56 is formed with a synthetic resin. The holder base 57 and holder cover 58 each have a semi-oval portion 60 and the thorny protrusions 59 are disposed at an each inner wall. The holder base 57 has a leaf spring holder 62 extending from the semi-oval portion 60 and a tapered protruding wall 63 above the leaf spring holder 62. The both semi-oval portions 60 are locked together with locking protrusions 64 and engaging frames 65 to form a cylindrical tube having an oval section.

The thorny protrusions 59 are arranged in the each semi-oval portion 60 with an equal pitch which is n times of the pitch of the grooves 25a of the corrugated tube 25, where n is integer such as 1, 2, 3. The protrusions 59 are molded integrally with the semi-oval portions 60 utilizing a synthetic resin and have a triangular pyramid or conical shape.

The leaf spring holder 62 extends and bends from the semi-oval portion 60. The second receiver face 63a at the leaf spring holder 62 is inclined with respect to a first receiver face 60a of the semi-oval portion 60 and extends into a direction of tangent of the annular wall 5 of the protector 4, see FIG. 2. The leaf spring holder 62 has the slit 66 for inserting the base end of the leaf spring 6 and the locking protrusion 40 to lock the leaf spring 6 as similar to the embodiment of FIG. 6. A receiver face 60a of the semi-oval portions 60 is flush with the engaging frame 65, the locking protrusion 64 engaging with the frame 65, and ribs 67 disposed at both sides of the engaging frame 65.

The leaf spring holder 62 of FIG. 11 can be formed to extend straight from the semi-oval portion 60 without bending such as the leaf spring holder 9' of FIG. 10. However, the straight type spring holder is only utilized for the annular wall 5 having a large diameter as described above.

In the above embodiments, the leaf spring holders 51, 62 are disposed at the second holder 29 of the spring holder 9, see FIG. 5, and the protruding wall 63 of the spring holder 56, see FIG. 11, respectively. They can be disposed at the first holder 28 of the spring holder 9 and the semi-oval portion 60 of the spring holder 56, respectively. In this case, especially to the embodiment of FIG. 5, the leaf spring 6 is curved along the receiver face 29a of the second holder 29.

In the electric supply apparatus described above, the protector 4 is arranged vertically inside the sliding door, or sliding body. The protector 4 can be arranged horizontally in the vehicle body, or static body, and one end of the wiring harness 7 is arranged from the elongated opening 14 to the sliding door and the other end thereof is arranged from the wiring harness lead-out to the vehicle body. The electric supply apparatus of the present invention is also adapted to a sliding seat of a motor vehicle or sliding doors other than motor vehicles.

What is claimed is:

1. An electric supply apparatus having a wiring harness comprising:
   a protector;
   an annular wall disposed inside the protector, the wiring harness being bent freely along said annular wall;
   a leaf spring arranged around the annular wall, said leaf spring being fixed to the annular wall at a base end; and
   a spring holder disposed at a front end of the leaf spring for holding the wiring harness at a loop forming portion thereof, and fastening together two protective tubes of the wiring harness.

2. The electric supply apparatus as claimed in claim 1, wherein said spring holder is bent at a middle portion thereof with an angle in a direction of tangent of the annular wall.

3. The electric supply apparatus as claimed in claim 2, wherein said spring holder has a leaf spring holder at the bent side thereof.

4. The electric supply apparatus as claimed in claim 1, wherein said spring holder has a rib at an inner wall of a middle portion thereof and said rib extends inwardly higher than an inner face of an end portion of the protective tube.

5. An electric supply apparatus having a wiring harness comprising:
   a protector;
   an annular wall disposed inside the protector, the wiring harness being bent freely along said annular wall;
   a leaf spring arranged around the annular wall, said leaf spring being fixed to the annular wall at a base end; and
   a spring holder disposed at a front end of the leaf spring for holding the wiring harness at a loop forming portion thereof, and fastening protective tubes of the wiring harness; wherein said spring holder fastens end portions of a corrugated tube and a net tube which form the protective tube, and the net tube is disposed along the leaf spring.

6. The electric supply apparatus as claimed in claim 5, wherein said spring holder includes a first holder having ribs for engaging with grooves of the corrugated tube and a second holder for holding an insertion member attached to the net tube.

7. An electric supply apparatus having a wiring harness comprising:
   a protector;
   an annular wall disposed inside the protector, the wiring harness being bent freely along said annular wall;
   a leaf spring arranged around the annular wall, said leaf spring being fixed to the annular wall at a base end; and
   a spring holder disposed at a front end of the leaf spring for holding the wiring harness at a loop forming portion thereof, and fastening protective tubes of the wiring harness; wherein said spring holder fastens end portions of a corrugated tube and a net tube which form the protective tube, and the net tube is disposed along the leaf spring; and wherein said spring holder has a rib at an inner wall of a middle portion thereof and said rib extends inwardly higher than an inner face of an end portion of the protective tube.

8. The electric supply apparatus as claimed in claim 7, wherein said spring holder includes a first holder having ribs for engaging with grooves of the corrugated tube and a second holder for holding an insertion member attached to the net tube.

* * * * *